US008856415B2

(12) United States Patent
Chandhoke

(10) Patent No.: US 8,856,415 B2
(45) Date of Patent: Oct. 7, 2014

(54) BUS ARBITRATION FOR A REAL-TIME COMPUTER SYSTEM

(75) Inventor: Sundeep Chandhoke, Austin, TX (US)

(73) Assignee: National Instruments Corporation, Austin, TX (US)

( * ) Notice: Subject to any disclaimer, the term of this patent is extended or adjusted under 35 U.S.C. 154(b) by 162 days.

(21) Appl. No.: 13/363,630

(22) Filed: Feb. 1, 2012

(65) Prior Publication Data

US 2013/0198429 A1 Aug. 1, 2013

(51) Int. Cl.
*G06F 13/00* (2006.01)
*G06F 12/00* (2006.01)
*G06F 13/14* (2006.01)
*G06F 13/38* (2006.01)

(52) U.S. Cl.
USPC .......................... 710/107; 710/240; 710/241

(58) Field of Classification Search
USPC .......................... 710/107, 240–244
See application file for complete search history.

(56) References Cited

U.S. PATENT DOCUMENTS

| | | | | |
|---|---|---|---|---|
| 4,868,742 A * | 9/1989 | Gant et al. | ............ | 710/30 |
| 4,897,834 A * | 1/1990 | Peterson et al. | ............ | 370/432 |
| 5,230,041 A * | 7/1993 | Dinwiddie et al. | ............ | 345/520 |
| 5,293,486 A * | 3/1994 | Jordan et al. | ............ | 710/220 |
| 5,572,686 A * | 11/1996 | Nunziata et al. | ............ | 710/116 |
| 5,706,446 A * | 1/1998 | Kalish et al. | ............ | 710/113 |
| 5,720,032 A * | 2/1998 | Picazo et al. | ............ | 709/250 |
| 5,774,658 A * | 6/1998 | Kalkunte et al. | ............ | 709/230 |
| 5,784,648 A * | 7/1998 | Duckwall | ............ | 710/40 |
| 5,890,134 A * | 3/1999 | Fox | ............ | 705/7.24 |
| 6,571,215 B1 * | 5/2003 | Mahapatro | ............ | 705/7.12 |
| 6,647,448 B1 * | 11/2003 | Brelin | ............ | 710/107 |
| 6,944,681 B1 * | 9/2005 | Christensen et al. | ............ | 710/8 |
| 7,379,888 B1 * | 5/2008 | Mahapatro | ............ | 705/7.13 |
| 7,613,856 B2 * | 11/2009 | Kastein et al. | ............ | 710/74 |
| 7,673,087 B1 * | 3/2010 | Ansari et al. | ............ | 710/241 |
| 7,970,970 B2 * | 6/2011 | Subramanian et al. | ............ | 710/112 |

(Continued)

FOREIGN PATENT DOCUMENTS

| | | | | |
|---|---|---|---|---|
| AU | 2011203492 A1 * | 2/2012 | ............ | G06Q 10/00 |
| JP | 60027949 A * | 2/1985 | ............ | G06F 9/46 |

(Continued)

OTHER PUBLICATIONS

Bing Guo; Yan Shen; Lei Zhang; Xiang Zhou, "Research and Design of Shared Resources Competition Solution among Hardware-Software Tasks based on Unified Scheduling," Embedded and Ubiquitous Computing, 2008. EUC '08. IEEE/IFIP International Conference on , vol. 2, pp. 467,471, Dec. 17-20, 2008.*

(Continued)

*Primary Examiner* — Faisal M Zaman
(74) *Attorney, Agent, or Firm* — Meyertons Hood Kivlin Kowert & Goetzel, P.C.; Jeffrey C. Hood

(57) ABSTRACT

In a real-time application, one or more computational tasks execute according to a time schedule and use input data from input devices and/or output data from output devices. One or more of the input devices or output devices may be unscheduled devices that attempt to access the peripheral bus at unscheduled times. Such unscheduled bus access can cause the time schedule to become comprised. Various methods for arbitrating access to the bus to better integrate the bus access with the time schedule followed by the application are described.

17 Claims, 10 Drawing Sheets

(56) References Cited

U.S. PATENT DOCUMENTS

| | | | |
|---|---|---|---|
| 8,041,869 B2 | 10/2011 | Thomas et al. | |
| 8,155,112 B2 | 4/2012 | Duckwall et al. | |
| 8,185,679 B2 | 5/2012 | Matsuse | |
| 8,190,802 B2 | 5/2012 | Vallius | |
| 2002/0034170 A1* | 3/2002 | Tiedemann et al. | 370/335 |
| 2002/0062415 A1* | 5/2002 | Wang et al. | 710/240 |
| 2002/0129181 A1* | 9/2002 | Lahiri et al. | 710/113 |
| 2002/0156669 A1* | 10/2002 | Verhaegh et al. | 705/8 |
| 2006/0190943 A1* | 8/2006 | Haeri | 718/103 |
| 2007/0094661 A1* | 4/2007 | Baird et al. | 718/102 |
| 2008/0066072 A1* | 3/2008 | Yurekli et al. | 718/104 |
| 2008/0155137 A1* | 6/2008 | Muppirala et al. | 710/39 |
| 2008/0298380 A1* | 12/2008 | Rittmeyer et al. | 370/412 |
| 2009/0172225 A1* | 7/2009 | Wiedenman et al. | 710/107 |
| 2009/0282413 A1* | 11/2009 | Cialini et al. | 718/102 |
| 2009/0288031 A1* | 11/2009 | Solaro et al. | 715/772 |
| 2010/0180056 A1* | 7/2010 | Matsuse | 710/107 |
| 2012/0072631 A1* | 3/2012 | Chirca et al. | 710/244 |

FOREIGN PATENT DOCUMENTS

| | | | | |
|---|---|---|---|---|
| JP | 62050933 A | * | 3/1987 | G06F 9/06 |
| JP | 03259345 A | * | 11/1991 | G06F 9/46 |
| JP | 2002063005 A | * | 2/2002 | G06F 3/12 |
| JP | 2007331178 A | * | 12/2007 | B41J 29/38 |
| WO | WO 02001344 A3 | * | 8/2002 | G06F 9/46 |

OTHER PUBLICATIONS

Ching-Chih Han; Shin, K.G.; Wu, J., "A fault-tolerant scheduling algorithm for real-time periodic tasks with possible software faults," Computers, IEEE Transactions on , vol. 52, No. 3, pp. 362,372, Mar. 2003.*

Monot, A.; Navet, N.; Bavoux, B.; Simonot-Lion, F., "Multisource Software on Multicore Automotive ECUs—Combining Runnable Sequencing With Task Scheduling,"Industrial Electronics, IEEE Transactions on , vol. 59, No. 10, pp. 3934,3942, Oct. 2012.*

Cortadella, J.; Kondratyev, A.; Lavagno, L.; Massot, M.; Moral, S.; Fasserone, C.; Watanabe, Y.; Sangiovanni-Vincentelli, A., "Task generation and compile-time scheduling for mixed data-control embedded software," Design Automation Conference, 2000. Proceedings 2000 , pp. 489,494, 2000.*

"The CoreConnect Bus Architecture," IBM, Sep. 1, 1999, retrieved from <https://www-01.ibm.com/chips/techlib/techlib.nsf/products/CoreConnect_Bus_Architecture> on Jan. 21, 2013; pp. 1-8.

* cited by examiner

BUS ARBITRATION FOR A REAL-TIME COMPUTER SYSTEM

FIELD OF THE INVENTION

The present invention relates to the field of real-time computer systems, and more particularly to a system and method for arbitrating access to a bus used by devices in a real-time computer system.

DESCRIPTION OF THE RELATED ART

Real-time computer systems use techniques to precisely control the timing of multiple software tasks. For example, a schedule may be divided into fixed time periods, and the execution times of each respective task may be controlled so that the task starts and ends its execution at a certain time offset within a given period. In this way, the timing of different software tasks can be controlled so that they begin and end their execution at precise time offsets within each period in order to meet time constraints required by the application.

In some real-time applications the software tasks may interact with peripheral devices that serve as input and output interfaces to physical elements used in the system. For example, the tasks may read input data from an input device and/or write output data to an output device. The use of peripheral devices in a real-time system can be problematic because the peripheral devices and the software tasks may need to share access to resources of the computer system, such as a memory controller or bus. The bus access or memory controller access for some peripheral devices may not be able to be statically scheduled. For example, an Ethernet device may access the bus sporadically at unscheduled times to receive data packets, where the arrival times of the data packets cannot be predetermined. This unscheduled bus access may interfere with bus access performed by the software tasks and cause the execution schedule of the tasks to become skewed.

SUMMARY OF THE INVENTION

Various arbitration methods and corresponding systems that use the arbitration methods are described. According to one embodiment of a first method, one or more tasks may be executed according to a time schedule. The time schedule may define specific execution start times for the one or more tasks. One or more unscheduled devices may attempt to access a bus at times not defined by the time schedule. Access to the bus by the one or more unscheduled devices may be controlled by turning on bus access for the one or more unscheduled devices at each respective execution start time for each of the one or more tasks, and turning off the bus access for the one or more unscheduled devices each time the one or more tasks complete execution.

According to one embodiment of a second method, one or more tasks may be executed according to a time schedule. The time schedule may define specific execution start times for the one or more tasks. One or more unscheduled devices may attempt to access a bus at times not defined by the time schedule. The time schedule may define specific times for bus access for the one or more unscheduled devices to be turned on and specific times for bus access for the one or more unscheduled devices to be turned off. The bus access for the one or more unscheduled devices may be turned on and off at the specific times defined by the time schedule.

According to one embodiment of a third method, one or more tasks may be executed in an application according to a time schedule. The time schedule may define specific execution start times for the one or more tasks. An unscheduled device may attempt to access a bus at times not defined by the time schedule. A priority level for the unscheduled device may be set. The priority level may specify a priority at which the unscheduled device is allowed to access the bus. The method may further comprise changing the priority level for the unscheduled device one or more times while the application is running.

BRIEF DESCRIPTION OF THE DRAWINGS

A better understanding of the present invention can be obtained when the following detailed description of the preferred embodiment is considered in conjunction with the following drawings, in which.

Figure 1:
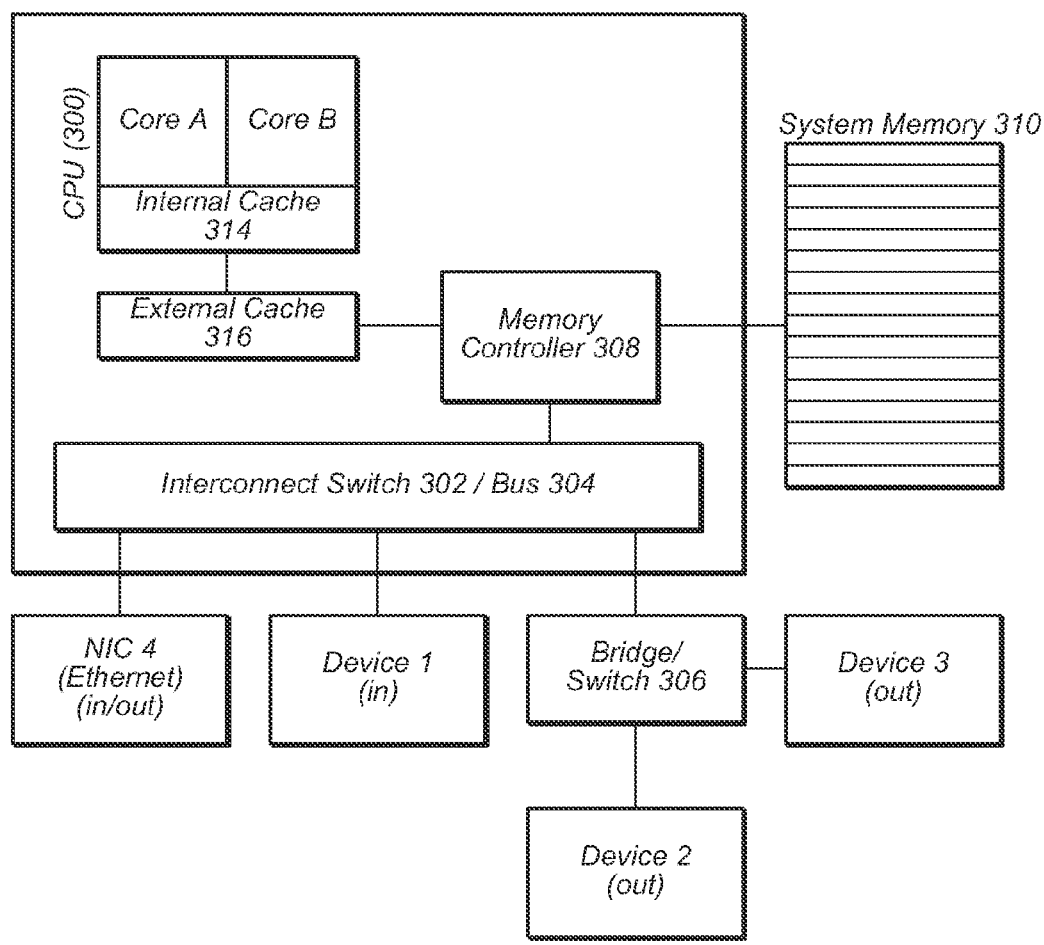
FIG. 1 illustrates an architecture for one example of a computer system configured to implement a real-time application.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Task—the term "software task" is intended to have the full breadth of its ordinary meaning, and includes any type of program instructions, code, script and/or data, or combinations thereof, that may be stored in a memory medium and executed by a processor or implemented on a programmable hardware element. Exemplary software tasks include code written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software.

Hardware Configuration Program—a program, e.g., a netlist or bit file, that can be used to program or configure a programmable hardware element.

Program—the term "program" is intended to have the full breadth of its ordinary meaning The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

The present description relates generally to a real-time application in which one or more tasks execute in a computer system according to a time schedule. For example, the schedule may be divided into fixed time periods, and each task may be controlled or scheduled so that it begins executing at a particular time offset relative to the beginning of a time period. The tasks may be implemented as software code executing on one or more processors, or may be implemented as tasks running on a programmable hardware element.

The application may also use one or more devices that provide input data to the tasks and/or use output data produced by the tasks. The devices may be coupled to a peripheral bus and may transmit data to and receive data from other components in the system via the bus. At least one of the devices used in the application may be an unscheduled device, e.g., a device that attempts to access the bus at times that are not scheduled or predetermined. If an unscheduled device accesses the bus at a time when another device is scheduled to access the bus then the other device may be blocked while it waits for access to the bus. This may result cause the time schedule to become skewed and possibly cause errors in the application. To address this problem, various methods of arbitrating bus access for the application are disclosed herein.

FIG. 1 illustrates an architecture for one example of computer system configured to implement a real-time application that uses an unscheduled device. In this example the CPU 300 is a master computational element that executes one or more tasks. Device 1 is an input peripheral device coupled to the peripheral bus 304. The Bridge/Switch element 306 is used to extend the bus fabric to allow more peripheral devices to be connected. Device 2 and Device 3 are output peripheral devices coupled to the bus 304 through the Bridge/Switch element 306. The network interface card (NIC) (Ethernet) device 4 is also connected to the peripheral bus 304. The Ethernet device 4 may enable the system to communicate with other similar or disparate systems. The Memory Controller 308 is used to arbitrate access of system memory 310 between the CPU 300 and the peripheral bus 304 (via the interconnect switch 302). The Interconnect Switch 302 also acts as an arbitration point for all devices accessing the peripheral bus 304. The CPU 300 cores A and B run the tasks which used cached memory kept in sync with the System Memory 310 by the Memory Controller 308.

Although in this example the tasks execute on a CPU, in other examples the tasks may be implemented on a programmable hardware element, such as an FPGA for example.

Figure 2:
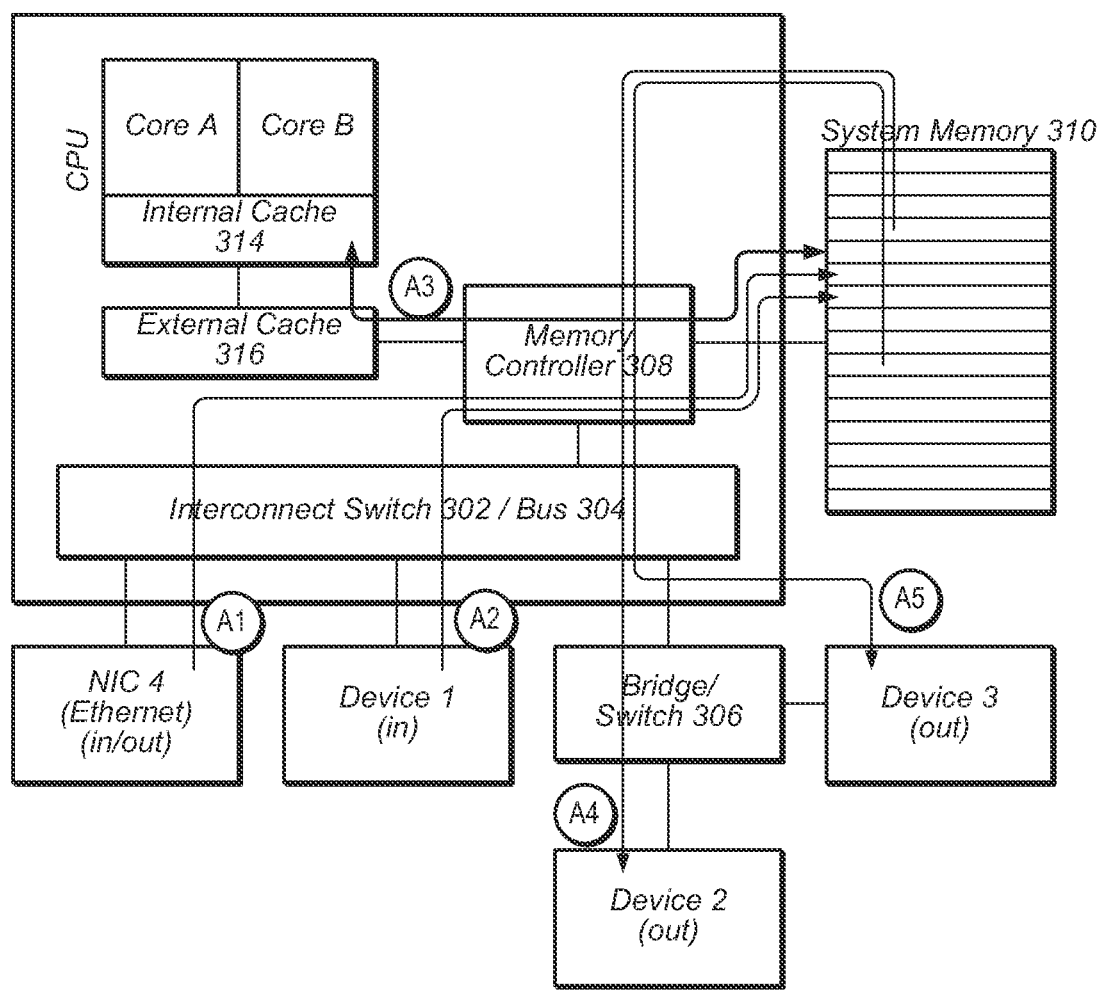
FIG. 2 illustrates data paths used in the application.

FIG. 2 illustrates data paths used in the application. As indicated by the arrows A1 and A2, the Ethernet device 4 and the input device 1 may write data to the system memory 310. As indicated by the double-headed arrow A3, the tasks executing on the CPU 300 may use this data, and may also write new output data to the system memory 310. As indicated by the arrows A4 and A5, this output data may be read by the output peripheral devices 2 and 3. It can be seen from FIG. 2 that the peripheral devices not only compete amongst themselves for access to the bus 304, but also compete with the CPU 300 for access to the system memory 310.

Figure 3:
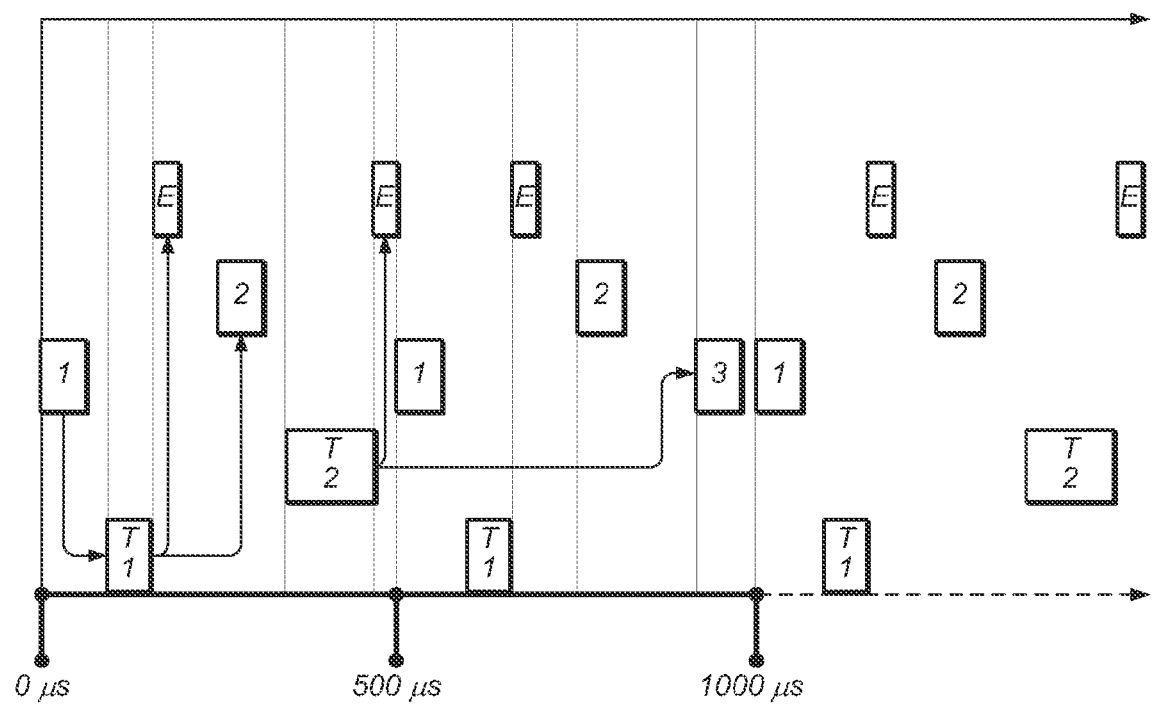
FIG. 3 illustrates an example of a time schedule for the application.

FIG. 3 illustrates an example of a time schedule for the application. In this example, there are two tasks T1 and T2 that execute on the CPU 300. Task T1 executes once every 500 µs. Each time the task T1 executes, it reads input data produced by the device 1 (as indicated by the arrow from the block labeled "1" to the block labeled "T1"). And each time the task T1 executes, it also writes output data used by the device 2 (as indicated by the arrow from the block labeled "T1" to the block labeled "2").

Task T2 executes once every 1000 μs. Each time the task T2 executes, it writes output data used by the device 3 (as indicated by the arrow from the block labeled "T2" to the block labeled "3").

Additionally both tasks T1 and T2 receive input data sporadically from the Ethernet device 4. Both tasks also write output data to the Ethernet device 4 at the end of their execution (as indicated by the arrows from the block labeled "T1" and "T2" to the blocks labeled "E").

For the sake of this example it is assumed that the devices 1, 2 and 3 as well as tasks running on the CPU use a global time source and hence can be scheduled to run at the pre-determined time offsets as shown in FIG. 3.

The only device that does not follow a pre-determined schedule is the Ethernet device 4. Since the arrival times of data packets received by the Ethernet device 4 cannot be completely made certain, the times for reading the data from the Ethernet device cannot be pre-determined. Also since the amount of time taken by the tasks to complete their execution can vary (e.g., based on the state of the application), the times when output data is written to the Ethernet device also cannot be pre-determined. Thus, the Ethernet device 4 is an unscheduled device since the times when it will access the bus to read or write data are not scheduled. All other devices can be made to read and write data at pre-determined offsets in their periods as shown in FIG. 3. This ensures that the tasks and the output devices (2 and 3) always have new data when they execute.

Although the execution times of the tasks T1 and T2 and the read/write times of the devices 1, 2 and 3 are scheduled, the unscheduled nature of the Ethernet device 4 may cause the schedule to become compromised. For example, the Device 1 is scheduled at the time 0 μs to access the bus 304 to write its data to the system memory 310. Suppose that just before the time 0 μs there is an Ethernet packet for task T2 ready on the Ethernet device to be written to the system memory 310. Since the bus 304 is not being used, the interconnect switch 302 may grant the Ethernet device 4 access to the bus 304. The packet then gets written to the system memory 310 via the bus 304 while the interconnect switch 302 holds off bus access for other devices. This may cause the device 1 to be held off from accessing the bus 304. When the device 1 eventually gets bus access, two things might happen. It may be time for task T1 to start running and since new data from device 1 has not yet made it to the system memory 310, the task T1 may run off stale data. Or it may be that device 1 gets to write its data, but because it accesses the memory location which task T1 needs to run, task T1 will get delayed since its cache will be waiting to get updated. Delaying of task T1 can affect everything that follows it. Either of these cases violates the schedule without the application being aware of it.

To overcome these problems, the bus access can be arbitrated using one of several methods described below to better integrate the bus access with the execution schedule followed by the application. In particular, three arbitration methods are described, which are referred to herein as dynamic arbitration, time-based arbitration, and dynamic priority assignment arbitration.

Figure 4:
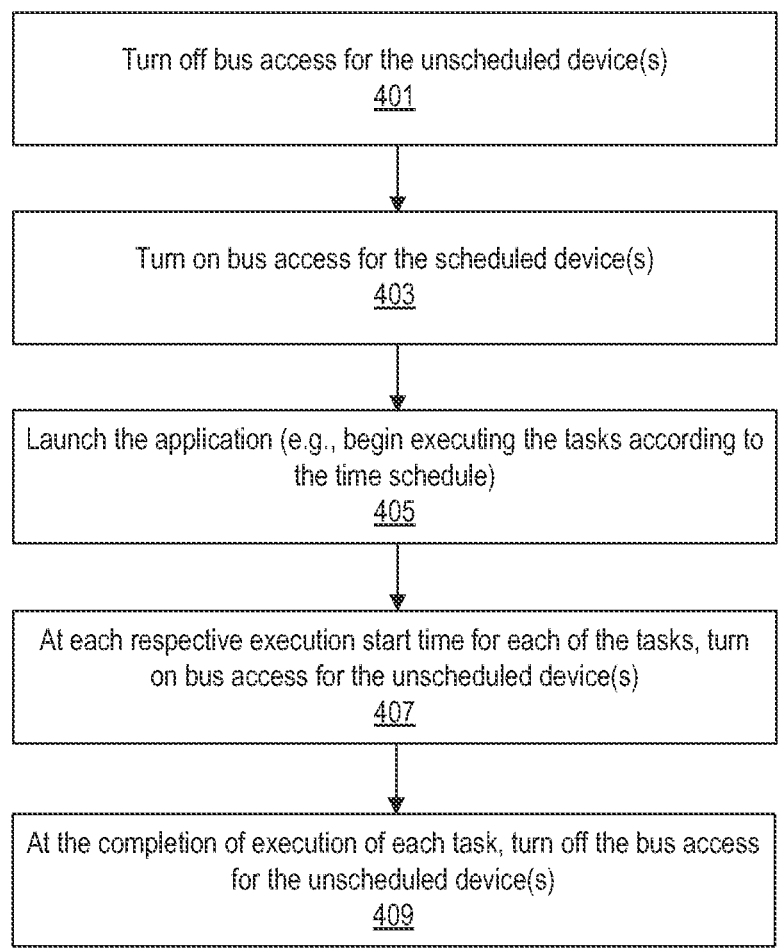
FIG. 4 is a flowchart diagram illustrating one embodiment of a dynamic arbitration method.

FIG. 4 is a flowchart diagram illustrating one embodiment of the dynamic arbitration method. The method may be used for arbitrating bus access in a real-time application in which tasks execute at times defined by a time schedule, where one or more unscheduled devices attempt to access the bus at times not defined by the time schedule.

As indicated in block 401, bus access for the unscheduled device(s) may initially be turned off. For example, the interconnect switch 302 may provide an application programming interface (API) that can be called in order to turn bus access on and off for particular devices. The application or the execution environment that manages the application may include code which executes at the beginning of the application to call the API of the interconnect switch 302 to turn off the bus access for each unscheduled device used in the application. For example, the code may pass one or more parameters that identify the unscheduled device(s) and request bus access to be turned off for that particular device(s). While the bus access is turned off, the interconnect switch 302 does not allow the unscheduled device(s) to access the bus 304.

In some embodiments the application may also use one or more scheduled devices that access the bus at particular times defined by the time schedule for the application. As indicated in block 403, bus access for the scheduled devices may be turned on. In some embodiments, bus access may be turned on for all devices by default so that no programmatic request is necessary to turn on the bus access for the scheduled devices. Bus access for the scheduled devices may remain turned on at all times during the execution of the application.

As indicated in block 405, the application may be launched or initiated. Launching the application may cause the tasks to begin executing according to the time schedule defined for the application. For example, each task may periodically begin executing at particular times specified by the schedule. If the application uses any scheduled devices then these devices may also begin reading and writing data according to the time schedule defined for the application. For example, a scheduled input device may access the bus at scheduled times in order to transfer data to be written into the system memory, e.g., where the data is used as input data by the tasks. Similarly, a scheduled output device may access the bus at scheduled times in order to transfer data read from the system memory, e.g., where the data is produced as output data by the tasks. In various embodiments any conventional technique may be used to control the execution timing for the tasks and the read/write timing for the scheduled devices.

At each respective execution start time for each of the tasks, bus access for the unscheduled device(s) may be turned on, as indicated in block 407. This may be implemented in various ways. For example, in some embodiments each task may include code that executes to call an API to turn on the bus access for the unscheduled device(s) when the task begins executing. In other embodiments a separate task may perform this functionality. For example, there may be a separate task that is scheduled to execute just before the execution start times of each of the other tasks, and this task may turn on the bus access for the unscheduled device(s).

At the completion of execution of each task, the bus access for the unscheduled device(s) may be turned off again, as indicated in block 409. For example, in some embodiments each task may include code that executes to call the API to turn off the bus access for the unscheduled device(s) when the task finishes executing. In other embodiments there may be a separate task that is scheduled to execute just after each of the other tasks complete their execution, and this task may turn off the bus access for the unscheduled device(s).

In the dynamic arbitration method, the times for the bus access for the unscheduled devices to be turned on and off are not explicitly or statically specified by a time schedule. Instead, the bus access is turned on and off dynamically in response to certain conditions or events that occur while the application is running, e.g., in response to a task beginning execution (in the case of turning on the bus access for the unscheduled devices) or in response to a task completing execution (in the case of turning off the bus access for the unscheduled devices).

Figure 5:
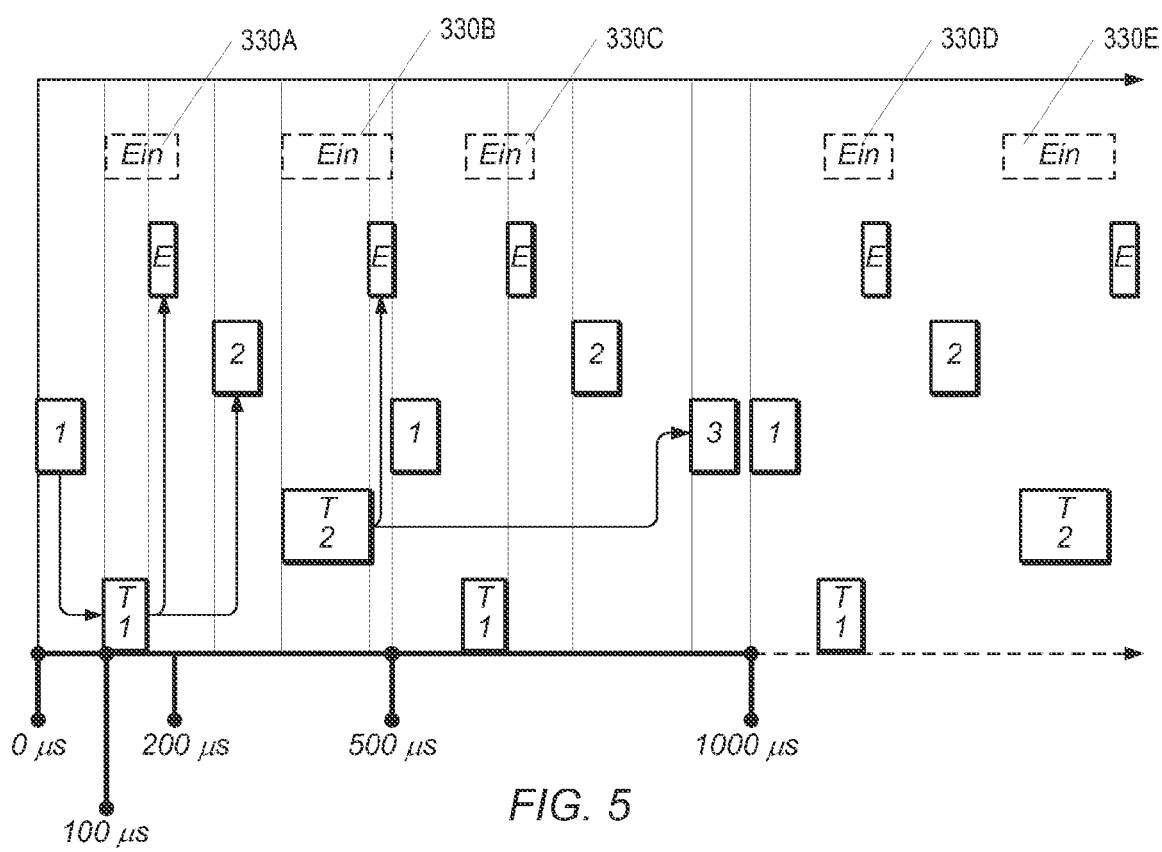
FIG. 5 illustrates an example of the dynamic arbitration method applied to the time schedule shown in FIG. 3.

FIG. 5 illustrates an example of the dynamic arbitration method applied to the time schedule shown in FIG. 3. As shown, the tasks T1 and T2 and the scheduled devices 1, 2 and 3 operate according to the same schedule as described above with reference to FIG. 3. Input from the unscheduled Ethernet device 4 is now effectively limited to particular times, as shown by the access time windows 330 at the top of the drawing. For example, the access time window 330A indicates that bus access for the Ethernet device is turned on at the time T=100 μs when the task T1 begins its first execution, and is turned back off again at the time T=200 μs when the task T1 finishes writing its output data to the Ethernet device. Thus, the Ethernet device is able to access the bus within the time window bounded by the execution start time at 100 μs and the execution end time at 200 μs. Similarly, the access time window 330B indicates another time window during which the Ethernet device is able to access the bus, with this window being defined by the execution start time and execution end time of the task T2. Thus, during any of the access time windows 330, the Ethernet device can access the bus 304 to write input data used by the tasks T1 and T2 into the system memory 310. At other times the interconnect switch 302 may prevent the Ethernet device from accessing the bus 304.

This dynamic control of the bus access for the Ethernet device may prevent the Ethernet device from accessing the bus at times that can block the scheduled devices from accessing the bus. Since none of the scheduled devices access the bus to read or write data during the time windows when the tasks T1 and T2 are executing, these time windows are safe times when the unscheduled Ethernet device can be allowed to access the bus without throwing off the time schedule used by the other devices.

It is noted that the Ethernet device itself may not be aware of the time schedule used by the application and may continue to attempt to access the bus at sporadic times not within the access time windows. However, since the interconnect switch 302 controls the access to the bus it can hold off the Ethernet device from actually accessing the bus at times when the bus access is turned off. Thus, if the Ethernet device requests to access the bus at a time not within one of its access time windows then its access may be blocked by the interconnect switch 302, and the Ethernet device may continue re-trying to access the bus until it is eventually successful after its bus access has been turned on at the beginning of the next access time window.

In this example it was the Ethernet device 4 that induced variation in the schedule. In other applications some other type of input or output device may be an unscheduled device that can attempt to access the bus at times not defined by the time schedule for the application.

Figure 6:
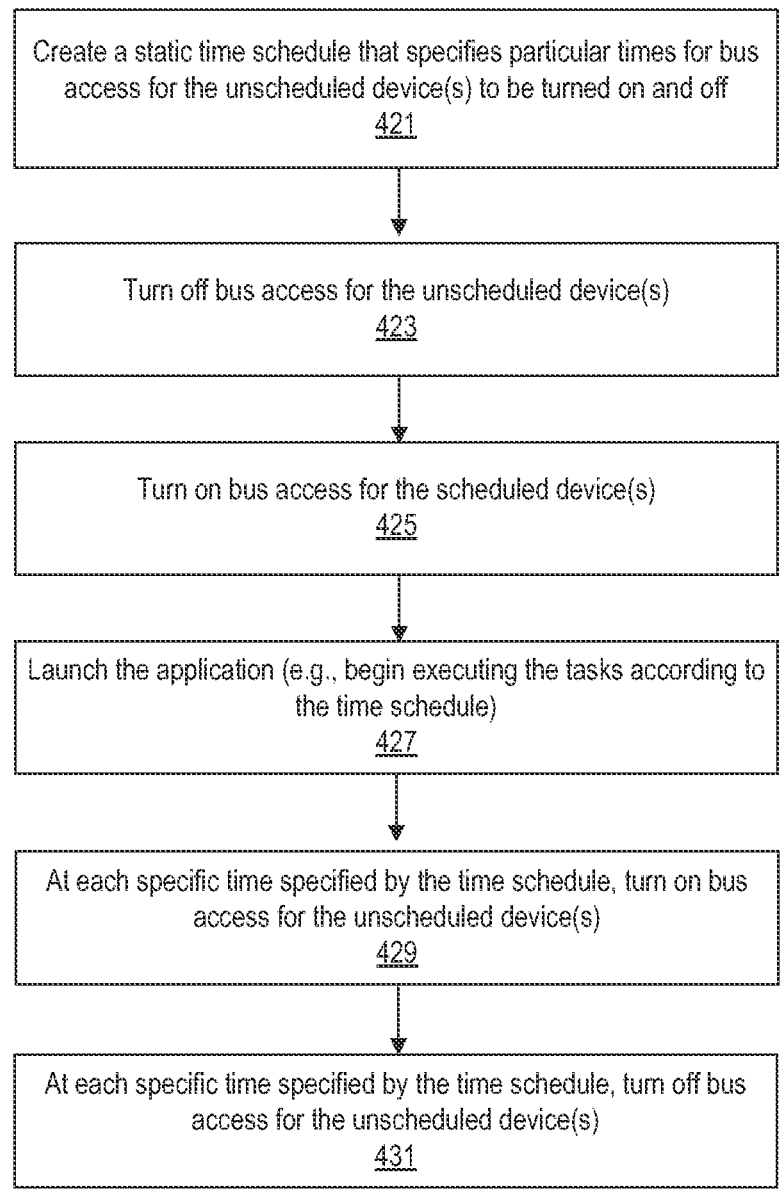
FIG. 6 is a flowchart diagram illustrating one embodiment of a time-based arbitration method.

FIG. 6 is a flowchart diagram illustrating one embodiment of the time-based arbitration method. The dynamic arbitration method described above is referred to as being "dynamic" because the times when the bus access for the unscheduled device(s) is turned on and off are not statically defined at predetermined times, but instead the bus access is dynamically turned on and off in response to the tasks beginning and ending execution. In contrast, in the time-based method, the times when the bus access for the unscheduled device(s) is turned on and off may be statically defined in advance of launching the application.

As indicated in 421, a static time schedule may be created. The static time schedule may define particular times for bus access for the unscheduled device(s) to be turned on and off. The static time schedule may also define the execution start times for the tasks, the execution end times for the tasks, the times when the scheduled devices read and write data to the system memory, etc.

At or prior to launching the application, the bus access for the unscheduled device(s) may be turned off, as indicated in block 423. The bus access for the scheduled device(s) may be turned on, as indicated in block 425, and may remain turned on while the application is running.

As indicated in block 427, the application may be launched and may begin running according to the time schedule. For example, the tasks may execute at the start times defined by the time schedule. In addition, the bus access for the unscheduled devices may be turned on at each specific time specified by the time schedule, as shown in block 429. Similarly, the bus access for the unscheduled devices may be turned off at each specific time specified by the time schedule, as shown in block 431.

In some embodiments a tool for creating the static time schedule in response to user input may be provided. For example, the tool may execute to display a graphical user interface that enables the user to specify the particular times for bus access for the unscheduled device(s) to be turned on and off. The tool may also allow the user to specify other timing information, such as the times when the tasks should begin and end their executions, as well as possibly specifying times when one or more scheduled devices should access the bus to read data from or write data to the system memory.

In various embodiments the particular times when the bus access for each unscheduled device should be turned on and off may be defined or specified in various ways. For example, in some embodiments the time schedule may be configured with the following information: 1) a Start time; 2) a period; 3) an offset time array; and 4) a corresponding timer length for each offset time. The Start time may indicate when the schedule is to be applied. The period may specify the repetition of the schedule. For example, the period may indicate that a new cycle of the schedule should begin every 500 microseconds. The offset time array specifies one or more times when the bus access for the unscheduled device should be turned on. The timer length corresponding to each offset time of the array specifies how long the bus access should remain turned on. The bus access may be turned off again when the timer expires. For example, the offset time array may specify that the bus access should be turned on at 125 microseconds into each cycle, and a corresponding timer length of 50 microseconds may specify that the bus access should be turned off again at 175 microseconds. The offset time array may specify more than one offset. For example, if the offset time array specifies an additional offset time of 270 microseconds with a corresponding timer length of 90 microseconds then after the bus access for the unscheduled device is turned off at 175 microseconds, it may be turned on again at 270 microseconds, and then turned off again at 360 microseconds.

As described above, the time windows during which the tasks execute are safe time windows during which the unscheduled devices can be allowed to access the bus. Thus, in some embodiments the user may configure the time schedule to cause the bus access for the unscheduled devices to be turned on at the same times when the tasks begin executing, and to cause the bus access for the unscheduled devices to be turned off at the same times when the tasks finish executing. In some embodiments the tool that creates the time schedule may be able to automatically configure the bus access to be turned on and off at these times so that the user may not need to manually configure these times.

In addition to the access time windows defined by the execution start and end times of the tasks, in some applications there may be other access time windows during which the unscheduled devices can be allowed to safely access the bus. Thus, in some embodiments, in addition to turning on the bus access for the unscheduled devices at the execution start times of the tasks, the time schedule may also be configured to turn on the bus access for the unscheduled devices at one or more additional times (and turn the bus access back off again after a suitable time duration).

Figure 7:
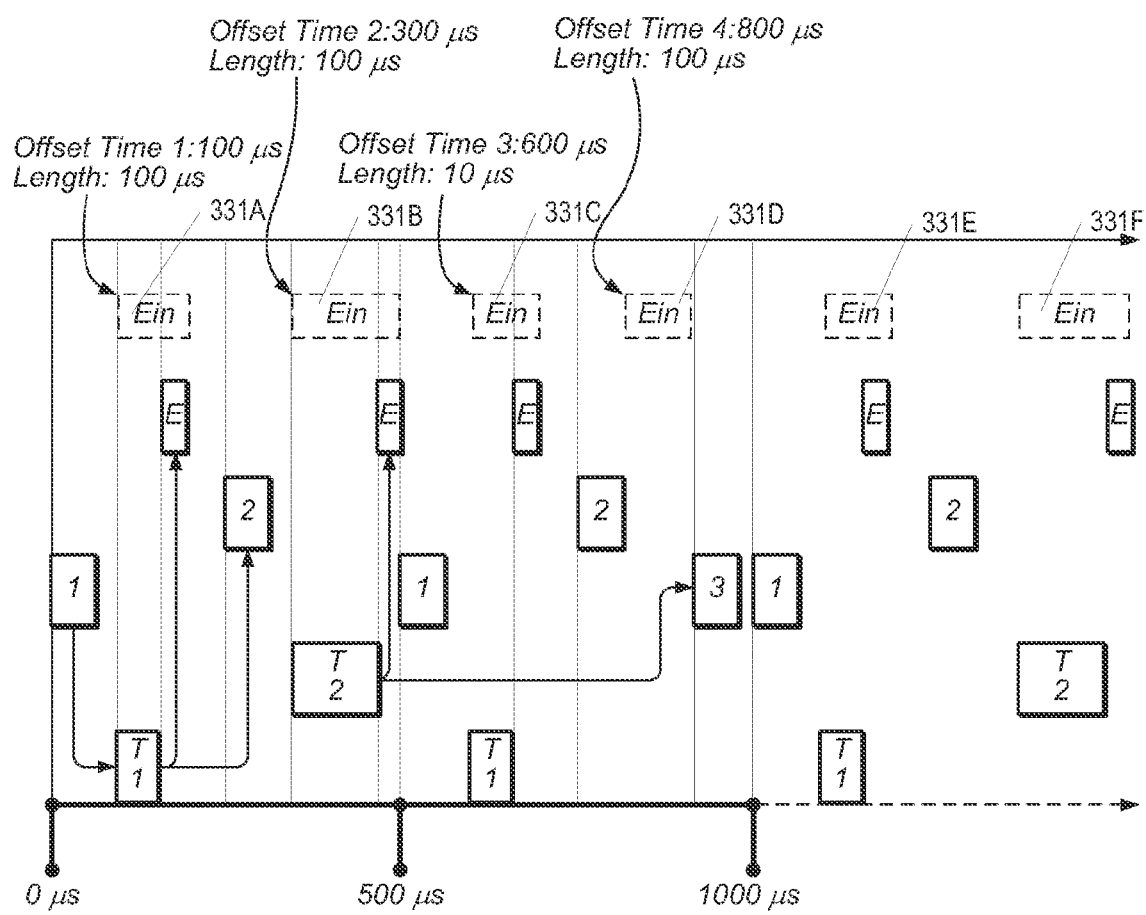
FIG. 7 illustrates an example of the time-based arbitration method applied to the time schedule shown in FIG. 3.

FIG. 7 illustrates an example of the time-based arbitration method applied to the time schedule shown in FIG. 3. As shown, the tasks T1 and T2 and the scheduled devices 1, 2 and 3 operate according to the same schedule as described above with reference to FIG. 3. Input from the unscheduled Ethernet device 4 is now effectively limited to particular times, as shown by the access time windows 331 at the top of the drawing. Whereas the access time windows 330 were dynamically determined in the case of the dynamic arbitration method discussed above, in this case the access time windows 331 are explicitly or statically defined by the time schedule. For example, the time schedule may explicitly specify that the bus access should be turned on at 100 microseconds into each cycle and turned off again after 100 microseconds, which defines the access time window 331A. Similarly, the other access time windows 331 are also explicitly or statically defined.

In this example, the access time windows 331A, 331B and 331C generally correspond to the access time windows 330A, 330B and 330C of FIG. 5. Notice however that there is an additional access time window 331D that does not have a corresponding access time window 330 in FIG. 5. This is because the offset time of 800 microseconds for the access time window 331D is not at the execution start time of one of the tasks, and thus the bus access would not be turned on at this time in the dynamic arbitration method. However, the user may determine that the bus access for the unscheduled devices can be safely turned on at this offset into the cycle. The access time window 331D lies between the time when device 2 finishes its operation and the time when device 3 begins its operation. Bus access for the unscheduled devices may be safely turned on during this time window since no other devices are scheduled to access the bus during this time window. Thus, the user may configure the time schedule to grant bus access during the access time window 331D as shown. Thus, in some embodiments the time-based arbitration method may allow additional access time windows to be defined that would not be used in the dynamic arbitration method.

In some embodiments the application may be configured to use a global time base to implement the time schedule, e.g., so that the execution of the tasks and the bus accesses performed by the devices are performed at the precise times specified by the schedule. In various embodiments any conventional timing or clock synchronization techniques may be used to keep the operation of the devices synchronized with the execution of the tasks. For example, in some embodiments the interconnect switch 302 and the memory controller 308 may use one or more separate clocks derived from the one that drives the CPU, and adjustments may be propagated to keep the clocks synchronized with the CPU clock. The tasks executing on the CPU may be also adjusted for clock drifts if necessary.

Figure 8:
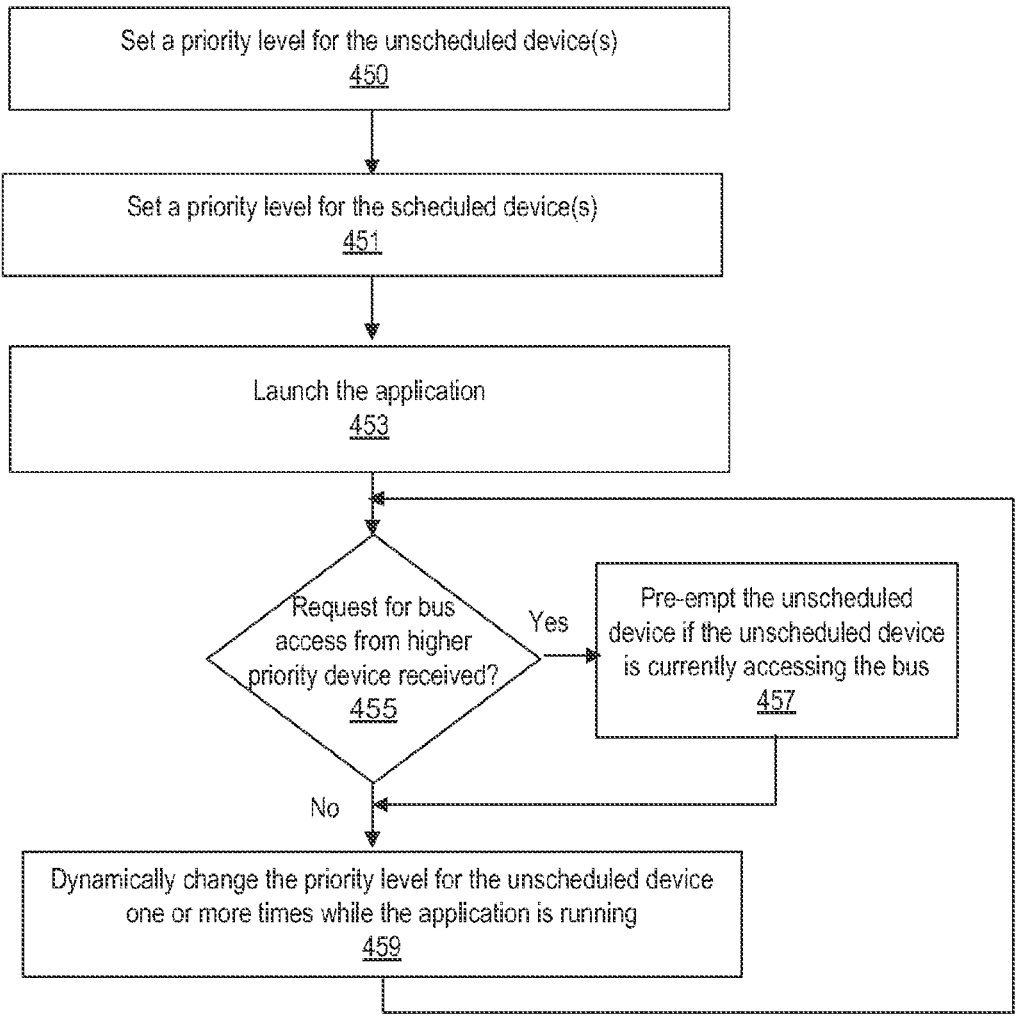
FIG. 8 is a flowchart diagram illustrating one embodiment of a dynamic priority assignment arbitration method.

FIG. 8 is a flowchart diagram illustrating one embodiment of the dynamic priority assignment arbitration method. This method involves setting a priority level for each respective device used in the application, where the priority level specifies a priority at which the respective device is allowed to access the bus. (As used herein, the higher the priority level, the greater the access to the bus.) As indicated in blocks 450 and 451, the unscheduled device(s) and the scheduled devices may be assigned a particular priority level. In various embodiments any priority levels may be assigned to the devices, but the unscheduled device(s) may be assigned lower priority levels then the scheduled devices.

As indicated in block 453, the application may be launched. While the application is running, the devices may attempt to access the bus at particular times. As indicated in blocks 455 and 457, if a device assigned a higher priority (e.g., a scheduled device) attempts to access the bus while an unscheduled device is already accessing the bus, then the unscheduled device may be pre-empted (e.g., may not be allowed to continue accessing the bus).

In some cases, pre-empting the bus access by the unscheduled device may result in partial transfer of data so that the data written to the system memory by the unscheduled device is not complete or is not coherent. In some embodiments, status information indicating the pre-empted state may be set. The status information may indicate that the transfer was pre-empted, thereby indicating that the data transferred by or transferred to that device is incoherent and may not be safe to access. The application may use the status information in determining how to treat the data.

In some embodiments the priority level for an unscheduled device (or a scheduled device) may be dynamically changed one or more times while the application is running For example, the priority level may be changed at various times depending on the state of the application, e.g., depending on whether the unscheduled device has a low or high need for bus access at a given time. For example, consider an application which uses an unscheduled Ethernet device and a scheduled input device. In one state of the application, e.g., a default state, it could be that the application has a higher priority to receive data from the scheduled device than from the Ethernet device. Thus, the Ethernet device may be initially be assigned the lowest priority level. In another state of the application, receiving data from the Ethernet device could be deemed more important, and hence the priority level of the Ethernet device could be dynamically changed to a higher level when the application enters this state. The priority level of the Ethernet device may later be lowered again if the application exits this state and returns to the default state. In some embodiments the application may include program code to change the priority level of various devices as appropriate depending on the state of the application.

In another example, a given device may be responsible for changing its own priority level depending on its own state. For example, when a device begins producing isochronous data or high priority data, the device may change its priority level to a higher value. If the device later begins producing asynchronous data or low priority data then the device may change its priority level to a lower value. This may prevent the need to use different types of data streams for different kinds of data produced by the device.

Figure 9:
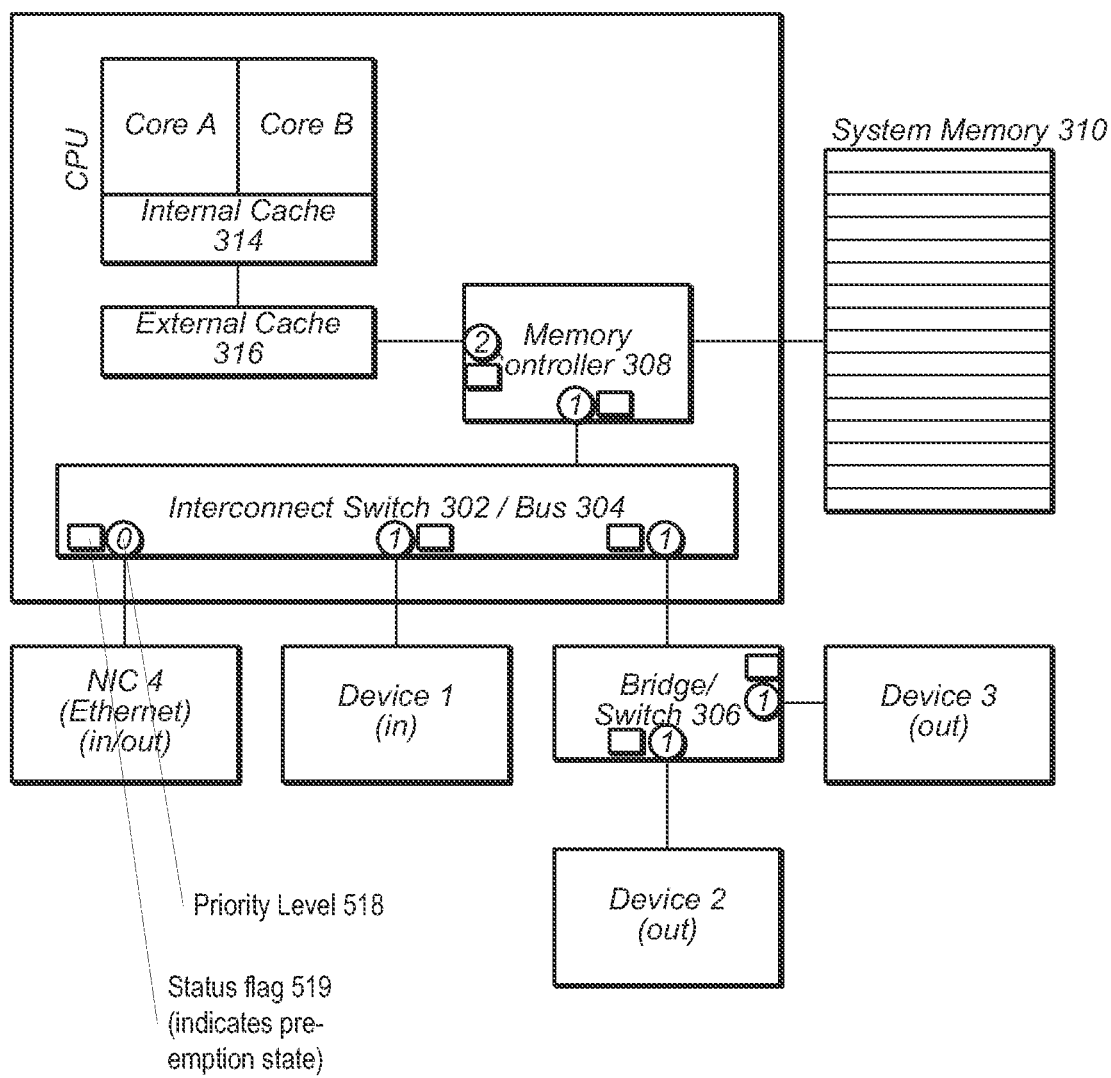
FIG. 9 illustrates an example in which default priority levels have been assigned to various devices.

FIG. 9 illustrates an example in which default priority levels have been assigned to various devices. As shown, the unscheduled Ethernet device 4 is assigned the lowest priority level of 0 so that it will be pre-empted from accessing the bus if higher priority devices request bus access. FIG. 9 also illustrates that status flags 519 may be used to indicate when pre-emption has occurred.

In further embodiments, various ones of the arbitration methods discussed above may be combined. For example, in a mixed mode of operation, the time-based arbitration method may be used in conjunction with the dynamic priority assignment arbitration method. For example, a static time schedule may be created which defines particular times for the priority level of an unscheduled device to be changed. This is similar to the time-based method, but instead of turning the bus access for the unscheduled device completely on or off, the priority level for the device is changed instead. For example, instead of turning on the bus access for the unscheduled device at a particular time, the priority level may instead be raised at that time. Similarly, instead of turning off the bus access for the unscheduled device at a particular time, the priority level may instead be lowered at that time.

Figure 10:
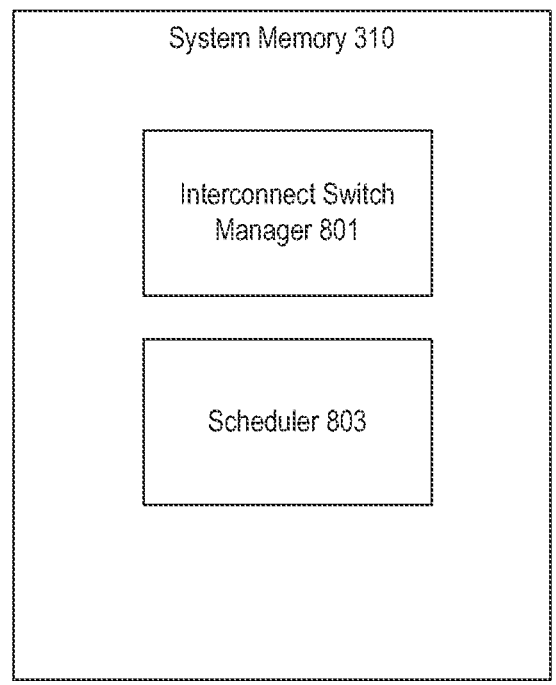
FIG. 10 is a block diagram illustrating examples of software components that may be used according to some embodiments.

It is noted that various software components may execute in the system to enable implementation of the arbitration methods discussed above. FIG. 10 is a block diagram illustrating examples of software components that may be stored in the system memory 310 and executed by the CPU 300 according to some embodiments. It is noted that software components or other program instructions for implementing the arbitration methods may also be stored on other types of computer-readable memory media.

In the illustrated embodiment the system memory 310 stores interconnect switch manager software 801 which may implement an API allowing other program code to request to turn on/off the bus access for the unscheduled device(s) and/or to change the priority level at which the unscheduled device(s) (and possibly scheduled devices as well) can access the bus. The interconnect switch manager software 801 may receive the programmatic requests to turn the bus access on/off or to change the priority levels for the devices and may perform the requests. In some embodiments the interconnect switch manager software 801 may also be configured to pre-empt a device from accessing the bus if a request for bus access is received from a higher priority device.

In some embodiments the system memory may also store a scheduler component 803 which may perform various functions to implement the arbitration methods described above. For example, to implement the time-based arbitration method, the scheduler component 803 may execute to turn on and off the bus access for the unscheduled devices at the times defined by the time schedule, e.g., by calling the API of the interconnect switch manager software 801. In some embodiments the scheduler component 803 may be a component of the interconnect switch manager software 801.

In various embodiments the arbitration methods described above may be used in any of various kinds of applications that use tasks which execute according to a time schedule and which interact with input and output devices. In some embodiments, the arbitration methods may be used for embedded systems, particularly systems that are designed for real time computation strongly interacting with physical elements. For example, the system may be a Cyber Physical System (CPS), also referred to as a Real Time CPS system. In such systems there is a strong emphasis on the combination and coordination between the system's computational tasks and physical elements. An input device may receive data from one set of physical elements and write it into system memory so that it can be read and used by the computational tasks. The computational tasks may also write output data into the system memory so that it can be read by an output device and written to a different set of physical elements to change their state.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method comprising:
   executing one or more software tasks statically scheduled according to a static time schedule, wherein the static time schedule defines specific execution start and end times for the one or more software tasks, wherein one or more unscheduled devices attempt to access a bus at times not defined by the static time schedule; and
   controlling access by the one or more unscheduled devices to the bus by turning on bus access for the one or more unscheduled devices at each respective execution start time for each of the one or more software tasks, and turning off the bus access for the one or more unscheduled devices each time the one or more software tasks complete execution per the static time schedule.

2. The method of claim 1,
   wherein access to the bus is controlled by a switch, wherein turning on the bus access for the one or more unscheduled devices comprises calling a programming interface of the switch to cause the switch to turn on bus access for the one or more unscheduled devices.

3. The method of claim 1, further comprising:
   prior to executing the one or more software tasks, turning off the bus access for the one or more unscheduled devices.

4. The method of claim 1, further comprising:
   turning on bus access for one or more scheduled devices that access the bus at times defined by the static time schedule, wherein the bus access for the one or more scheduled devices remains turned on without being turned off.

5. The method of claim 1, further comprising:
   receiving a request by a first unscheduled device to access the bus at a particular time when the bus access for the one or more unscheduled devices is turned off; and
   in response to determining that the bus access for the one or more unscheduled devices is turned off at the particular time, preventing the first unscheduled device from accessing the bus at the particular time.

6. The method of claim 1,
   wherein executing the one or more software tasks comprises executing the one or more software tasks on one or more processors.

7. The method of claim 1,
   wherein executing the one or more software tasks comprises executing the one or more software tasks on one or more programmable hardware elements.

8. A non-transitory computer-readable memory medium storing program instructions executable by one or more processors to:
   execute one or more software tasks statically scheduled according to a static time schedule, wherein the static time schedule defines specific execution start and end times for the one or more software tasks, wherein one or more unscheduled devices attempt to access a bus at times not defined by the static time schedule; and
   control access by the one or more unscheduled devices to the bus by turning on bus access for the one or more unscheduled devices at each respective execution start time for each of the one or more software tasks, and turning off the bus access for the one or more unscheduled devices each time the one or more software tasks complete execution.

9. The non-transitory computer-readable memory medium of claim 8,
   wherein access to the bus is controlled by a switch, wherein turning on the bus access for the one or more unscheduled devices comprises calling a programming interface of the switch to cause the switch to turn on bus access for the one or more unscheduled devices.

10. A method comprising:

executing one or more software tasks statically scheduled according to a static time schedule, wherein the static time schedule defines specific execution start and end times for the one or more software tasks, wherein one or more unscheduled devices attempt to access a bus at times not defined by the static time schedule;

wherein the static time schedule defines specific times for bus access for the one or more unscheduled devices to be turned on and specific times for bus access for the one or more unscheduled devices to be turned off, wherein the method further comprises turning on and off the bus access for the one or more unscheduled devices at the specific times defined by the static time schedule.

11. The method of claim 10, wherein the static time schedule specifies that bus access for the one or more unscheduled devices should be turned on at each of the execution start times for the one or more tasks.

12. The method of claim 11, wherein the static time schedule also defines specific execution completion times for the one or more software tasks; and wherein the static time schedule specifies that bus access for the one or more unscheduled devices should be turned off at each of the execution completion times for the one or more software tasks.

13. The method of claim 11, wherein in addition to the execution start times for the one or more software tasks, the static time schedule also specifies that bus access for the one or more unscheduled devices should be turned on at one or more other specific times.

14. The method of claim 10, further comprising:

creating the static time schedule in response to user input, wherein creating the static time schedule comprises receiving user input specifying the specific times for the bus access for the one or more unscheduled devices to be turned on and off 15. The method of claim 14, wherein the static time schedule is divided into time periods; and wherein receiving the user input specifying the specific times for the bus access for the one or more unscheduled devices to be turned on and off comprises:

receiving user input specifying one or more time offsets indicating when the bus access for the one or more unscheduled devices should be turned on relative to a beginning of a time period;

for each of the time offsets, receiving user input specifying a length of time for the bus access for the one or more unscheduled devices to remain turned on.

16. A non-transitory computer-readable memory medium storing program instructions executable by one or more processors to:

execute one or more software tasks statically scheduled according to a static time schedule, wherein the static time schedule defines specific execution start and end times for the one or more tasks, wherein one or more unscheduled devices attempt to access a bus at times not defined by the static time schedule;

wherein the time schedule defines specific times for bus access for the one or more unscheduled devices to be turned on and specific times for bus access for the one or more unscheduled devices to be turned off, wherein the program instructions are further executable by one or more processors to turn on and off the bus access for the one or more unscheduled devices at the specific times defined by the static time schedule.

17. The non-transitory computer-readable memory medium of claim 16, wherein the static time schedule specifies that bus access for the one or more unscheduled devices should be turned on at each of the execution start times for the one or more software tasks.

* * * * *

UNITED STATES PATENT AND TRADEMARK OFFICE
CERTIFICATE OF CORRECTION

| | | |
|---|---|---|
| PATENT NO. | : 8,856,415 B2 | Page 1 of 1 |
| APPLICATION NO. | : 13/363630 | |
| DATED | : October 7, 2014 | |
| INVENTOR(S) | : Chandhoke | |

It is certified that error appears in the above-identified patent and that said Letters Patent is hereby corrected as shown below:

In the Claims:

Claim 8, Column 14, Line 63, please delete "complete execution." and substitute -- complete execution per the static time schedule. --.

Signed and Sealed this
Twenty-seventh Day of January, 2015

Michelle K. Lee
*Deputy Director of the United States Patent and Trademark Office*